(12) United States Patent
Benes et al.

(10) Patent No.: US 9,722,813 B2
(45) Date of Patent: Aug. 1, 2017

(54) CONSUMER DIRECTED ENERGY MANAGEMENT SYSTEMS AND METHODS

(75) Inventors: Charles R. Benes, Denver, CO (US);
Rebecca F. Premus, Broomfield, CO (US); Michael K. Ruth, Longmont, CO (US); Carol L. Stimmel, Boulder, CO (US); Adrian C. Tuck, Longmont, CO (US); Andrew J. Wheeler, San Francisco, CA (US)

(73) Assignee: Tendril Networks, Inc., Boulder, CO (US)

( * ) Notice: Subject to any disclaimer, the term of this patent is extended or adjusted under 35 U.S.C. 154(b) by 714 days.

(21) Appl. No.: 12/555,751

(22) Filed: Sep. 8, 2009

(65) Prior Publication Data

US 2010/0070101 A1    Mar. 18, 2010

Related U.S. Application Data

(60) Provisional application No. 61/095,244, filed on Sep. 8, 2008.

(51) Int. Cl.
*H04L 12/18*       (2006.01)
*H04L 12/28*       (2006.01)
(Continued)

(52) U.S. Cl.
CPC .... *H04L 12/2818* (2013.01); *H04L 2012/285* (2013.01)

(58) Field of Classification Search
CPC ........... H04L 12/2818; H04L 2012/285; H04L 27/2626; B60L 11/1816; B60L 11/1824;
(Continued)

(56) References Cited

U.S. PATENT DOCUMENTS

| 5,179,556 A | 1/1993 | Turner |
| 5,572,438 A | 11/1996 | Ehlers et al. |

(Continued)

FOREIGN PATENT DOCUMENTS

| WO | WO-0074306 A2 | 12/2000 |
| WO | WO-1268503 A1 | 5/2012 |

OTHER PUBLICATIONS

International Search Report and Written Opinion; International Application No. PCT/US2011/061470; mailed Apr. 9, 2014; 9 pages.

(Continued)

*Primary Examiner* — Kenneth M Lo
*Assistant Examiner* — Sunray R Chang
(74) *Attorney, Agent, or Firm* — Perkins Coie LLP

(57) ABSTRACT

Methods and systems for providing consumer directed energy management are described. Consumer defined triggers provide consumers and utilities with the ability to control residential energy usage, by managing manage multiple residential load control elements. A user interface is provided separately from the load control elements to allow the consumer to define his or her schedule and preferences for the purposes of controlling the multiple load control elements. In addition, settings on load control elements can be automatically adjusted based on information about consumer schedules and preferences obtained from other sources. In some embodiments, a utility interface allows utilities to implement improved energy load control. When a utility expects to implement a load control event, the utility can monitor consumer schedules and/or preferences, in order to achieve the desired energy reduction while reducing the impact on participating consumers' comfort.

26 Claims, 7 Drawing Sheets

| Consumer Identifier | Trigger | Trigger Level(s) | Action(s) |
|---|---|---|---|
| consumer1 | Price | $0.35 | Set cooling setpoint to 80°. |
| consumer1 | WindPower | 15% | Set cooling setpoint to 75°. |
| consumer2 | Schedule | Asleep | Turn off TV outlet. Set heating setpoint to 62°. |
| consumer2 | CriticalityEvent | High | Turn off washing machine and dryer. |

(51) Int. Cl.
*H04L 27/26* (2006.01)
*B60L 11/18* (2006.01)
*G01D 4/00* (2006.01)
*H04B 3/54* (2006.01)

(58) Field of Classification Search
CPC . B60L 11/1846; B60L 11/1861; G01D 4/004; H04B 3/546
See application file for complete search history.

(56) References Cited

U.S. PATENT DOCUMENTS

| | | | |
|---|---|---|---|
| 5,684,710 | A | 11/1997 | Ehlers et al. |
| 5,696,695 | A | 12/1997 | Ehlers et al. |
| 5,719,861 | A | 2/1998 | Okanoue |
| 5,865,991 | A | 2/1999 | Hsu |
| 5,924,486 | A | 7/1999 | Ehlers et al. |
| 5,949,976 | A | 9/1999 | Chappelle |
| 5,959,529 | A | 9/1999 | Kail, IV |
| 6,028,857 | A | 2/2000 | Poor |
| 6,092,207 | A | 7/2000 | Kolinski et al. |
| 6,178,362 | B1 | 1/2001 | Woolard et al. |
| 6,208,247 | B1 | 3/2001 | Agre et al. |
| 6,216,956 | B1 | 4/2001 | Ehlers et al. |
| 6,631,309 | B2 | 10/2003 | Boies et al. |
| 6,640,248 | B1 | 10/2003 | Jorgensen |
| 6,680,922 | B1 | 1/2004 | Jorgensen |
| 6,684,339 | B1 | 1/2004 | Willig |
| 6,785,592 | B1 | 8/2004 | Smith et al. |
| 6,859,831 | B1 | 2/2005 | Gelvin et al. |
| 6,947,483 | B2 | 9/2005 | Engwer |
| 7,058,657 | B1 | 6/2006 | Berno |
| 7,062,389 | B2 | 6/2006 | Johnson et al. |
| 7,130,719 | B2 | 10/2006 | Ehlers et al. |
| 7,171,287 | B2 * | 1/2007 | Weiss ............................ 700/291 |
| 7,245,947 | B2 | 7/2007 | Salokannel et al. |
| 7,263,450 | B2 | 8/2007 | Hunter |
| 7,266,428 | B2 | 9/2007 | Alexanian |
| 7,302,634 | B2 | 11/2007 | Lucovsky |
| 7,333,821 | B2 | 2/2008 | Willey |
| 7,356,548 | B1 | 4/2008 | Culp et al. |
| 7,505,852 | B2 | 3/2009 | Board |
| 7,552,033 | B1 | 6/2009 | Culp et al. |
| 1,016,671 | A1 | 7/2011 | Kordik et al. |
| 8,176,095 | B2 | 5/2012 | Murray et al. |
| 8,239,046 | B2 | 8/2012 | Koehler et al. |
| 2002/0002636 | A1 | 1/2002 | Vange et al. |
| 2002/0071398 | A1 | 6/2002 | Moran et al. |
| 2003/0069970 | A1 | 4/2003 | Kim et al. |
| 2003/0190912 | A1 | 10/2003 | Jampolsky et al. |
| 2004/0117330 | A1 * | 6/2004 | Ehlers et al. ................. 705/412 |
| 2004/0133314 | A1 * | 7/2004 | Ehlers et al. ................. 700/276 |
| 2004/0138981 | A1 * | 7/2004 | Ehlers et al. .................. 705/36 |
| 2004/0139038 | A1 * | 7/2004 | Ehlers et al. ................. 705/412 |
| 2004/0249515 | A1 | 12/2004 | Johnson et al. |
| 2004/0260411 | A1 * | 12/2004 | Cannon ........................... 700/83 |
| 2004/0262410 | A1 * | 12/2004 | Hull .............................. 236/91 R |
| 2005/0038571 | A1 | 2/2005 | Brickfield et al. |
| 2005/0043829 | A1 | 2/2005 | Rossides |
| 2005/0055137 | A1 * | 3/2005 | Andren et al. ................. 700/291 |
| 2005/0096060 | A1 | 5/2005 | Rajkotia et al. |
| 2005/0096857 | A1 | 5/2005 | Hunter |
| 2005/0124358 | A1 | 6/2005 | Willey |
| 2005/0157723 | A1 | 7/2005 | Kim et al. |
| 2006/0200542 | A1 | 9/2006 | Willig |
| 2006/0209789 | A1 | 9/2006 | Gupta et al. |
| 2007/0043477 | A1 | 2/2007 | Ehlers et al. |
| 2007/0043478 | A1 | 2/2007 | Ehlers et al. |
| 2007/0097993 | A1 * | 5/2007 | Bojahra et al. ................ 370/401 |
| 2007/0155379 | A1 * | 7/2007 | Shamoon ............... G01D 21/00 455/423 |
| 2007/0174644 | A1 | 7/2007 | Willig |
| 2007/0251461 | A1 | 11/2007 | Reichard et al. |
| 2008/0129495 | A1 | 6/2008 | Hitt |
| 2008/0263196 | A1 | 10/2008 | Kansal et al. |
| 2008/0306985 | A1 | 12/2008 | Murray et al. |
| 2009/0007706 | A1 | 1/2009 | Hitt et al. |
| 2009/0045256 | A1 | 2/2009 | McInerney et al. |
| 2009/0059842 | A1 | 3/2009 | Maltseff et al. |
| 2009/0304101 | A1 * | 12/2009 | Loporto ................. G01D 4/004 375/260 |
| 2010/0010678 | A1 | 1/2010 | Dawson et al. |
| 2010/0031324 | A1 | 2/2010 | Strich et al. |
| 2010/0042453 | A1 | 2/2010 | Scaramellino et al. |
| 2010/0070101 | A1 | 3/2010 | Benes et al. |
| 2010/0070102 | A1 | 3/2010 | Benes et al. |
| 2012/0323637 | A1 | 12/2012 | Cushing et al. |
| 2013/0013121 | A1 | 1/2013 | Henze et al. |

OTHER PUBLICATIONS http://www.diykyoto.com/, accessed on Aug. 9, 2010.
http://www.theenergydetective.com/home, accessed on Aug. 9, 2010.
http://www.bluelineinnovations.com, accessed on Aug. 9, 2010.
http://www.theowl.com/, accessed on Aug. 9, 2010.
http://www.ambientdevices.com/products/energyjoule.html, accessed on Aug. 9, 2010.
http://hes.lbl.gov/consumer, accessed on Aug. 9, 2010.
http://www.greenenergyoptions.co.uk/, accessed on Aug. 9, 2010.
http://onzo.com/solutions/, accessed on Aug. 9, 2010.
http://www.opower.com/Products/Overview.aspx, accessed on Aug. 9, 2010.
http://www.alertme.com/, accessed on Aug. 9, 2010.
http://silverspringnetworks.com/products/index.html, accessed on Aug. 9, 2010.
http://www.agilewaves.com/, accessed on Aug. 9, 2010.
http://www.energyhub.net, accessed on Aug. 9, 2010.
http://www.tendrilinc.com/products/vision/,accessed on Aug. 9, 2010.
http://www.powermand.com/dreamwatts-product, accessed on Aug. 9, 2010.
http://www.energy-aware.com/, accessed on Aug. 9, 2010.
http://www.consert.com/, accessed on Aug. 9, 2010.
http://www.lem.com/hq/en/content/view/276/215/, accessed on Aug. 9, 2010.
http://www.google.com/powermeter/about/, accessed on Aug. 9, 2010.
http://blog.microsoft-hohm.com/Hohm-energy-report-sample.aspx, accessed on Aug. 9, 2010 http://efficiency20.com/, accessed on Aug. 9, 2010.
Retzlaff et al. Conservation & Energy Potential Study for Smith River Rancheria:, Smith River Rancheria, Evergreen NRG/Strategic Energy Solutions, Aug. 2005, 417 pages.
U.S. Appl. No. 61/446,233; Inventor: Henze; Date of Filing: Feb. 24, 2011, 17 pages.
Kennedy, James and Russell Eberhart. "Particle Swarm Optimization," Proceedings of the IEEE International Conference on Neural Networks (Perth, Australia), 1995, pp. 1942-1948.
Doebber, I."Investigation of Concrete Wall Systems for Reducing Heating nad Cooling Requirements in Single Family Residences" [online], Sep. 2004 [retrieved on Mar. 9, 2014]. Retrieved from the Internet: <URL: http://scholar.lib.vt.edu/theses/available/etd-10262004-21448/unrestricted/FinalThesis.pdf>.

* cited by examiner

| Consumer Identifier | Trigger | Trigger Level(s) | Action(s) |
|---|---|---|---|
| consumer1 | Price | $0.35 | Set cooling setpoint to 80°. |
| consumer1 | WindPower | 15% | Set cooling setpoint to 75°. |
| consumer2 | Schedule | Asleep | Turn off TV outlet. Set heating setpoint to 62°. |
| consumer2 | CriticalityEvent | High | Turn off washing machine and dryer. |

FIG. 4 ically implemented load control events. Nor do these systems have methods whereby consumers can communicate such preferences to the utility. For example, on a given hot afternoon, some consumers in a load control region may be away from home, while others are at home. Even if a utility were able to achieve its desired load reduction by controlling the cooling systems of only those consumers who are away from home, the utility currently lacks techniques for determining such user schedules and/or preferences. Because the utility cannot determine the schedule and/or preferences of each user at a current time, the utility must resort to controlling all of the users in the load control region together. While current systems may allow a consumer to override a load control event once it has been scheduled or implemented, it would be preferable if the user could avoid participating in the load control event based on their status and/or preferences.

CONSUMER DIRECTED ENERGY MANAGEMENT SYSTEMS AND METHODS

CROSS-REFERENCE TO RELATED APPLICATION(S)

This application claims priority to, and incorporates by reference in its entirety, U.S. Provisional Patent Application No. 61/095,244, entitled "Consumer Directed Energy Management System," filed on Sep. 8, 2008.

TECHNICAL FIELD

The present technology relates to systems and methods for reducing residential energy usage. More specifically, the present technology relates to the use of consumer defined triggers for automatically adjusting the behavior of multiple energy consuming devices at the consumer's residence, for the purposes of reducing energy consumption.

BACKGROUND

Residential heating and cooling systems consume significant amounts of energy. Accordingly, energy management devices have been designed to regulate the operation of residential heating and cooling systems, in an effort to reduce the energy consumption of these systems. For example, self-contained, programmable thermostats allow consumers to set various heating or cooling setpoints that apply to different times of day.

Due to the generally limited nature of programmable thermostat user interfaces (e.g., small display, few buttons), programming such a thermostat is difficult. Moreover, such user interfaces provide limited functionality for programming and control. For example, a consumer's energy usage patterns may change quite often or in complex ways that are difficult or impossible to describe via a thermostat's user interface. For instance, a given consumer may have a late meeting one weeknight, and on another weekday may be home for the entire day instead of going to work. Setting a conventional thermostat to accommodate these behavioral changes requires a significant amount of programming. As a result, few thermostats are used effectively to reduce residential energy usage.

Systems available to consumers for controlling other residential energy loads are even more limited. Programmable timers can be used to switch on and off energy loads within a residence, but these timers have even more limited user interfaces than programmable thermostats. Programmable timers are typically limited to allowing a consumer to specify a few on and off times of an associated energy consuming device throughout the day. As with programmable thermostats, the ability to link programmable timers to consumers' changing schedules and preferences is unavailable.

In addition, in order to minimize peak usage on energy grids, utility companies have implemented direct control systems for large residential loads, such as heating and cooling systems, water heaters, and pool pumps. However, such direct load control systems usually have little or no consumer involvement. Instead, such systems allow the utility alone to define when a residential load is to be turned off, suiting only the energy reduction needs of the utility.

Existing direct load control systems have several disadvantages. For example, such systems treat each consumer in a given group the same as all other consumers in the group. These systems do not contemplate that each consumer may have different preferences regarding participation in utility-

SUMMARY

Methods and systems for providing consumer directed energy management are described. Consumer defined triggers provide consumers and utilities with the ability to control residential energy usage. The techniques described herein enable consumers to manage multiple load control elements in their residences. A user interface is provided separately from the load control elements to allow the consumer to define his or her schedule and preferences for the purposes of controlling the multiple load control elements. In addition, the techniques described herein interface with other sources of information about consumer schedules and preferences, and automatically adjust settings on load control elements accordingly.

In some embodiments, the techniques described herein additionally provide an interface to a utility company for the purposes of energy load control. When the utility expects to implement a load control event, the techniques described herein allow the utility to monitor consumer schedules and/or preferences, in order to achieve the desired energy reduction while reducing the impact on participating consumers' comfort.

This Summary is provided to introduce a selection of concepts in a simplified form that are further described herein in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a block diagram of a data structure for storing consumers' preferences.

DETAILED DESCRIPTION

Figure 1:
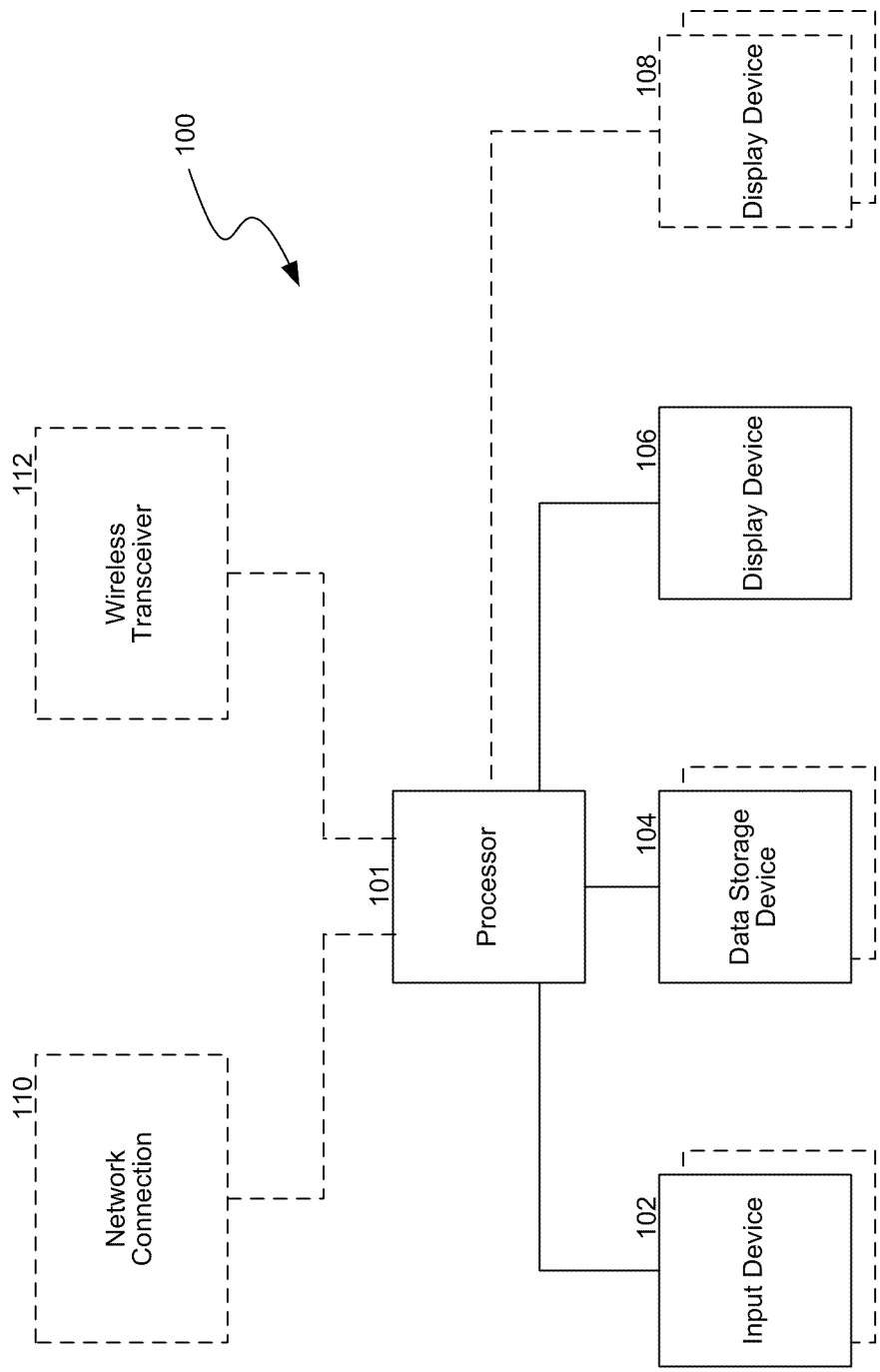
FIG. 1 is a block diagram of a computer system that may employ aspects of the disclosure.

Methods and systems for providing consumer directed energy management are described. Consumer defined triggers provide consumers and utilities with the ability to control residential energy usage. The techniques described herein enable consumers to manage multiple load control elements in their residences. A user interface is provided separately from the load control elements to allow the consumer to define his or her schedule and preferences for the purposes of controlling the multiple load control elements. In addition, the techniques described herein interface with other sources of information about consumer schedules and preferences, and automatically adjust settings on load control elements accordingly.

In some embodiments, the techniques described herein additionally provide an interface to a utility company for the purposes of energy load control. When the utility expects to implement a load control event, the techniques described herein allow the utility to monitor consumer schedules and/or preferences, in order to achieve the desired energy reduction while reducing the impact on participating consumers' comfort. The techniques described herein overcome the limitations of existing residential load control systems, in addition to providing other benefits.

The techniques described herein enable consumers to manage multiple residential load control elements, including, but not limited to, remotely-controlled outlets, thermostats, and appliances. A user interface is provided separately from the load control elements to allow the consumer to define his or her schedule and preferences for the purposes of controlling the multiple load control elements. For example, a consumer's schedule may indicate when the consumer is asleep, when the consumer is awake but at home, and when the consumer is away from home. By separating the user interface from the load control elements, the consumer may define his or her schedule and preferences without the constraints of small, limited user interfaces associated with the load control elements. In addition, such a user interface allows the consumer to define his or her schedule and preferences once for many load control elements, instead of separately for each element.

In addition to allowing a consumer to define his or her schedule and preferences via a user interface, the techniques described interface with other sources of information about a consumer's schedule and/or preferences. These sources of information include location information from mobile phone networks, calendar information from electronic calendar applications, and other sources of information.

The techniques described herein allow the consumer to define various preferences, or triggers, for the purposes of reducing residential energy usage. For example, a consumer can define preferences relating to the price of energy. In some areas, the price of energy varies by time of day, season, and other factors. The techniques described herein allow consumers to set triggers related the price of energy and maintain connections to sources of energy price data, in order to automatically act on consumers' preferences when energy prices change. As another example, a consumer can define preferences related to energy sources (e.g., wind, solar, coal), such as in accordance with the consumer's sensitivity to the carbon footprint of generated energy. For instance, a consumer can specify that when large amounts of wind power are available on an energy grid, the consumer is willing to use more energy, since the environmental impact of the delivered energy is lower. The consumer can specify that when wind power becomes unavailable, the consumer's energy consumption should similarly be reduced (e.g., by changing the consumer's heating and/or cooling setpoints to reduce the amount of energy used by the heating and/or cooling systems).

In some embodiments, the techniques described herein additionally provide an interface to a utility company for the purposes of energy load control. When the utility expects to implement a load control event, the techniques described herein allow the utility to monitor consumer schedules and/or preferences, in order to achieve the desired energy reduction while reducing the impact on participating consumers' comfort. For example, the utility can determine the consumers whose schedules and/or preferences indicate that they are currently at home, and tailor the load control event to minimize the involvement and impact on consumers who are at home.

In some embodiments, consumers define voluntary energy reduction behavior associated with a series of utility-defined criticality levels. For example, a utility may define criticality levels of Low, Medium, High, and Critical. Consumers can specify different behaviors for each of these criticality levels, such as different heating and cooling setpoints, controllable outlets that are to be shut off at each level, and other behaviors. This information is used by the utility to determine how much energy load reduction is available at each criticality level, and to select the level that provides the desired energy reduction with the least impact on consumers.

The present disclosure describes embodiments of consumer directed energy management systems and methods. Several specific details are set forth in the following description and in the Figures to provide a thorough understanding of certain embodiments of the disclosure. One skilled in the art, however, will understand that the present disclosure may have additional embodiments, and that other embodiments of the disclosure may be practices without several of the specific features described herein, or with additional features.

1. Embodiments of Computing Environments

FIG. 1 and the following discussion provide a general description of a suitable computing environment in which aspects of the disclosure can be implemented. Although not required, aspects and embodiments of the disclosure will be described in the general context of computer-executable instructions, such as routines executed by a general-purpose computer, e.g., a server or personal computer. Those skilled in the relevant art will appreciate that the disclosure can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The disclosure can be embodied in a special purpose computer or data processor that is specifically programmed, configured, or constructed to perform one or more of the computer-executable instructions explained in detail below. Indeed, the term "computer," as used generally herein, refers to any of the above devices, as well as any data processor.

The disclosure can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or sub-routines may be located in both local and remote memory storage devices. Aspects of the disclosure described herein may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the disclosure may reside on a server computer, while corresponding portions reside on a client computer. Data structures and transmission of data particular to aspects of the disclosure are also encompassed within the scope of the disclosure.

Referring to FIG. 1, some embodiments of the disclosure employ a computer 100, such as a personal computer or workstation, having one or more processors 101 coupled to one or more user input devices 102 and data storage devices 104. The computer is also coupled to at least one output device such as a display device 106 and one or more optional additional output devices 108 (e.g., printer, plotter, speakers, tactile or olfactory output devices). The computer may be coupled to external computers, such as via an optional network connection 110, a wireless transceiver 112, or both.

The input devices 102 may include a keyboard and/or a pointing device such as a mouse or haptic device. Other input devices are possible such as a microphone, joystick, pen, touch screen, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, and other media. Indeed, any medium for storing or transmitting computer-readable instructions and data may be employed, including a connection port to or node on a network such as a local area network (LAN), wide area network (WAN) or the Internet (not shown in FIG. 1).

Figure 2:
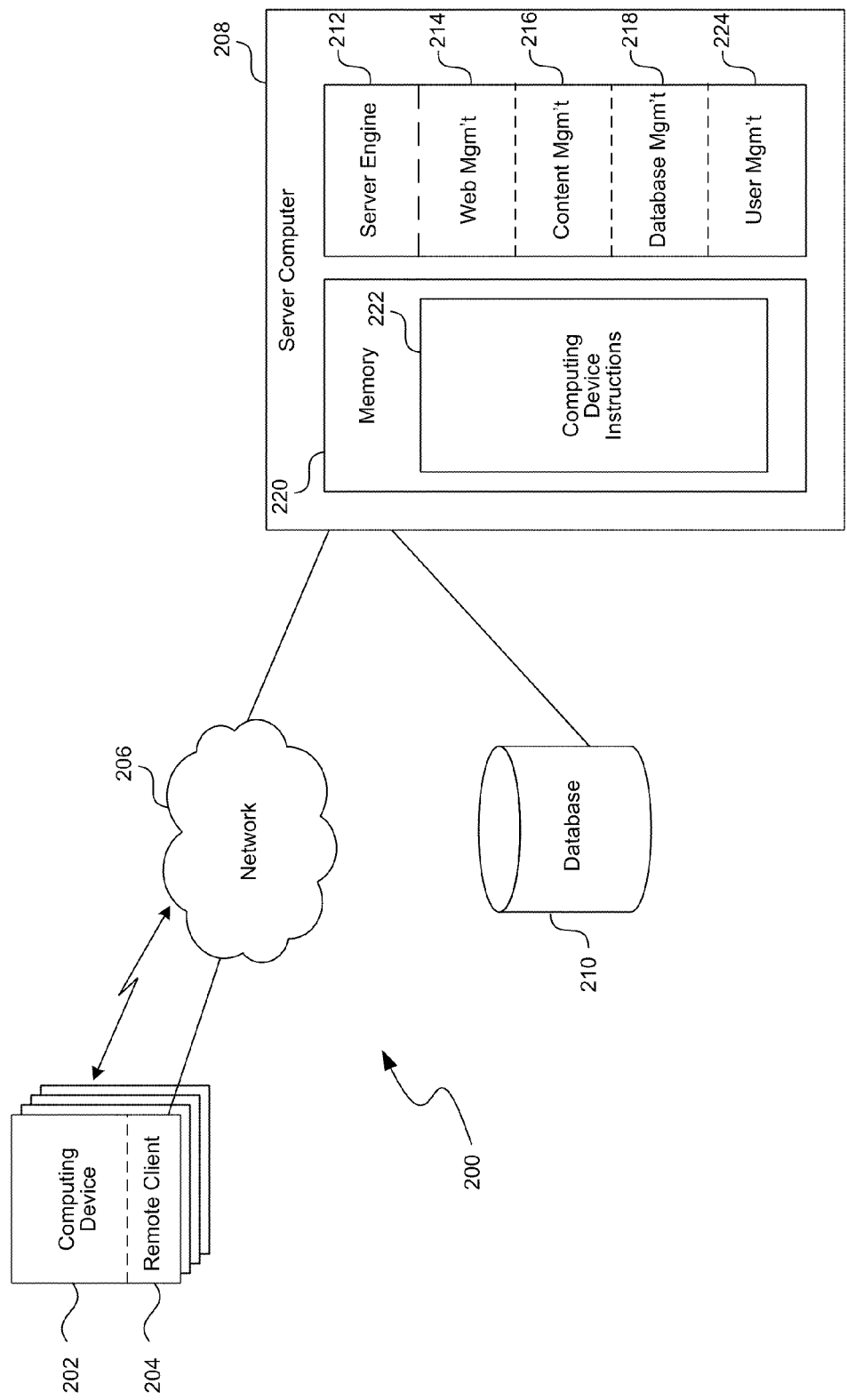
FIG. 2 is a block diagram of a computer system in which aspects of the disclosure may operate in a networked computer environment.

Aspects of the disclosure may be practiced in a variety of other computing environments. For example, referring to FIG. 2, a distributed computing environment with a network interface includes one or more computing devices 202 (e.g., a client computer) in a system 200, each of which includes a remote client module 204 that permits the computing device to access and exchange data with the network 206 (e.g., Internet or intranet), including web sites within the World Wide Web portion of the Internet. The computing devices 202 may be substantially similar to the computer described above with respect to FIG. 1. Computing devices 202 may include other program modules such as an operating system, one or more application programs (e.g., word processing or spread sheet applications), and the like. The computing devices 202 may be general-purpose devices that can be programmed to run various types of applications, or they may be single-purpose devices optimized or limited to a particular function or class of functions. While shown with remote client applications using Internet protocols or proprietary communication protocols for communication via network 206, any application program (e.g., network browser) for providing a graphical user interface to users may be employed, as described in detail herein.

At least one server computer 208, coupled to the network 206 (e.g., Internet or intranet) 206, performs many or all of the functions for receiving, routing, and storing electronic messages, such as web pages, data streams, audio signals, and electronic images. While the Internet is discussed, a private network, such as an intranet, may indeed be preferred in some applications. The network may have a client-server architecture, in which a computer is dedicated to serving other client computers, or it may have other architectures such as peer-to-peer, in which one or more computers serve simultaneously as servers and clients. In some embodiments, a database 210 or databases, coupled to the server computer(s), can store much of the content exchanged between the computing devices 202 and the server 208. The server computer(s), including the database (s), may employ security measures to inhibit malicious attacks on the system, and to preserve integrity of the messages and data stored therein (e.g., firewall systems, secure socket layers (SSL), password protection schemes, encryption, and the like).

The server computer 208 can also contain an internal memory component 220. The memory 220 can be standard memory, secure memory, or a combination of both memory types. The memory 220 and/or other data storage device 210 can contain computer readable media having computing device instructions 222. The encoded computing device instructions 222 are electronically accessible to at least one of the computing devices 208 and 202 for execution. In further embodiments, computing device instructions 222 can include basic operating instructions (e.g., source code) or other instructions.

The server computer 208 may include a server engine 212, a web page management component 214, a content management component 216, a database management component 218 and a user management component 224. The server engine performs basic processing and operating system level tasks. The web page management component 214 handles creation and display or routing of web pages. Users may access the server computer by means of a URL associated therewith. The content management component 216 handles most of the functions in the embodiments described herein. The database management component 218 includes storage and retrieval tasks with respect to the database 210, queries to the database, read and write functions to the database and storage of data such as video, graphics, and audio signals. The user management component 224 can support authentication of a computing device to the server 208.

Many of the functional units described herein have been labeled as modules, in order to more particularly emphasize their implementation independence. For example, modules may be implemented in software for execution by various types of processors, such as processor 101. An identified module of executable code may, for instance, comprise one or more physical or logical blocks of computer instructions which may, for instance, be organized as an object, procedure, function, or algorithm. The identified blocks of computer instructions need not be physically located together, but may comprise disparate instructions stored in different locations which, when joined logically together, comprise the module and achieve the stated purpose for the module.

A module may also be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

2. Consumer Directed Energy Management Systems and Methods

Methods and systems for providing consumer directed energy management are described. Consumer defined triggers provide consumers and utilities with the ability to control residential energy usage. The techniques described herein enable consumers to manage multiple load control elements in their residences. A user interface is provided separately from the load control elements to allow the consumer to define his or her schedule and preferences for the purposes of controlling the multiple load control elements. In addition, the techniques described herein interface with other sources of information about consumer schedules and preferences, and automatically adjust settings on load control elements accordingly.

In some embodiments, the techniques described herein additionally provide an interface to a utility company for the purposes of energy load control. When the utility expects to implement a load control event, the techniques described herein allow the utility to monitor consumer schedules and/or preferences, in order to achieve the desired energy reduction while reducing the impact on participating consumers' comfort.

Figure 3:
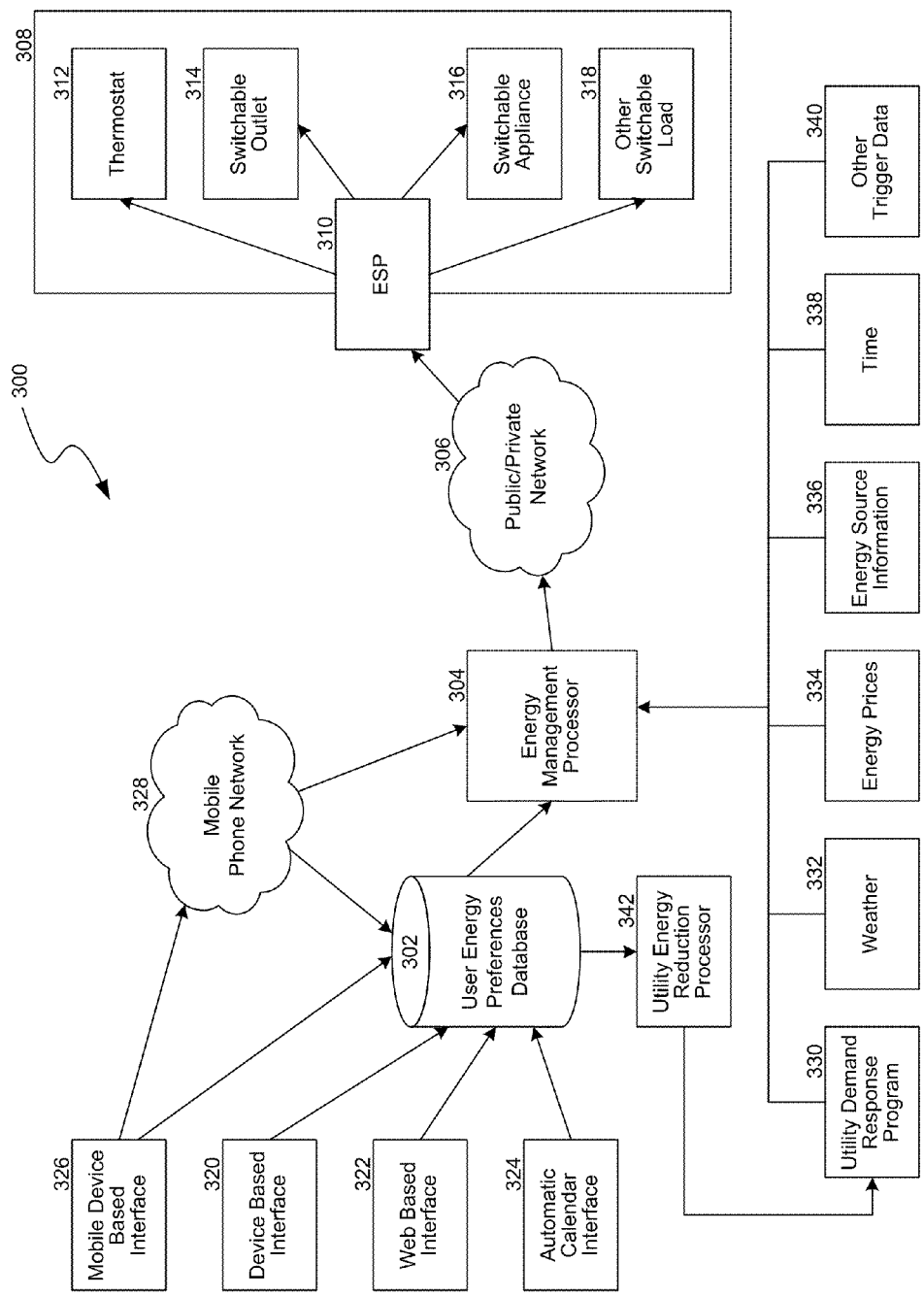
FIG. 3 is a block diagram of a system for providing consumer directed energy management in accordance with embodiments of the disclosure.

FIG. 3 is a block diagram of a system 300 for providing consumer directed energy management in accordance with embodiments of the disclosure. The system 300 includes a user energy preferences database 302 that stores information associated with a utility's consumers. In particular, the database 302 stores information about consumers' schedules and preferences related to residential energy usage.

In some embodiments, consumer preferences comprise a trigger, a level (or levels) of the trigger, and one or more actions related to load control elements that are to be performed when the trigger level is reached. A trigger may relate to the price of energy, the source of energy, a consumer's schedule, a utility defined criticality event, or a variety of other events and/or information. A consumer sets at least one level that applies to the trigger. For example, if the trigger is the price of energy, the consumer sets an energy cost (e.g., $0.25/kilowatt-hour (kWh)) at which the consumer desires settings to be changed on one or more residential load control elements. In addition, the consumer defines one or more actions regarding the residential load control elements that are to be taken when the trigger level is satisfied. For example, the consumer may set a particular heating or cooling setpoint for a thermostat. Together, the trigger, trigger level(s), and action(s) define consumer preferences regarding residential energy usage.

FIG. 4 is a block diagram of a representative data structure 400 that the user energy preferences database 302 can use to store consumers' preferences. One skilled in the art will appreciate that the data structure 400 is merely illustrative, and a variety of other data structures are possible. For example, each trigger type (e.g., price, source, schedule, criticality event) may be stored in a separate data structure.

The data structure 400 depicted in FIG. 4 includes consumer identifiers 405, triggers 510, trigger levels 415, and actions 420. A consumer identifier is a unique identifier associated with a consumer. The consumer identifier may be a string comprising alphanumeric characters, or another unique identifier. The consumer identifier is used to match the consumer's preferences with personal information associated with the consumer, including data identifying the consumer's home network, which is controlled in response to the consumer's preferences.

The data structure 400 depicted in FIG. 4 includes sample consumer preferences, illustrated by records 425 through 440. As described above, a consumer can define preferences relating to the price of energy. Record 425 represents a first consumer that desires his cooling setpoint to be set to 80 degrees when energy prices are above $0.35/kilowatt-hour (kWh). As another example, a consumer can define preferences related to energy sources. Record 430 represents a consumer who desires his cooling setpoint to be set to 75 degrees when greater than 15 percent of the energy is coming from wind power sources. Consumers can also define preferences related to their schedule, such as when they are home, away, or asleep. Record 435 represents a consumer that desires the outlet connected to his television to be turned off and his heating setpoint to be set to 62 degrees when his schedule shows that he is asleep. In addition, consumers can set preferences related to utility defined criticality events. Record 440 represents a consumer that desires his washing machine and dryer to be turned off when the utility indicates that there is a high criticality load control event. The records 425 through 440 included in the data structure 400 are included for illustrative purposes only. One skilled in the art will recognize that a variety of other records, triggers, trigger levels, and actions are contemplated by the techniques described herein. For example, a variety of other consumer preferences, whether defined by the utility or the consumer (whether in whole or in part) are usable to control associated load control elements.

Returning to FIG. 3, consumer preferences are used by an energy management processor 304 to control multiple load control devices in a consumer's residential network 308 via a network 306. The residential network 308 can be a wired and/or wireless network. In some embodiments, the residential network 308 includes devices configured according to a single network technology, while in other embodiments, the residential network 308 includes devices configured according to multiple network technologies. Available network technologies include, but are not limited to, IEEE 802.11/WiFi, IEEE 802.15.4/ZigBee, Homeplug, and other network technologies.

In some embodiments, the network 306 via which the energy management processor 304 communicates with the residential network 308 is a public network (e.g., Internet or an intranet), while in other embodiments, the network 306 is a private network (e.g., a Meter Reading Network or an Advanced Metering Infrastructure Network). The load control elements in the residential network 308 are connected to the network 306 via an Energy Service Portal (ESP) device 310. In some embodiments, the ESP device 310 functions may reside in one or more load control elements in the residential network 308. The load control elements can include a thermostat 312, a switchable outlet 314, a switchable appliance 316, and/or other switchable loads 318.

Consumer preferences in the user energy preferences database 302 can be set through a variety of user interfaces on a variety of different devices. FIG. 1 illustrates multiple user interfaces that a consumer may use to set his or her preferences, including a device based interface 320, a web based interface 322, an automatic calendar interface 324, and a mobile device based interface 326.

Figure 5:
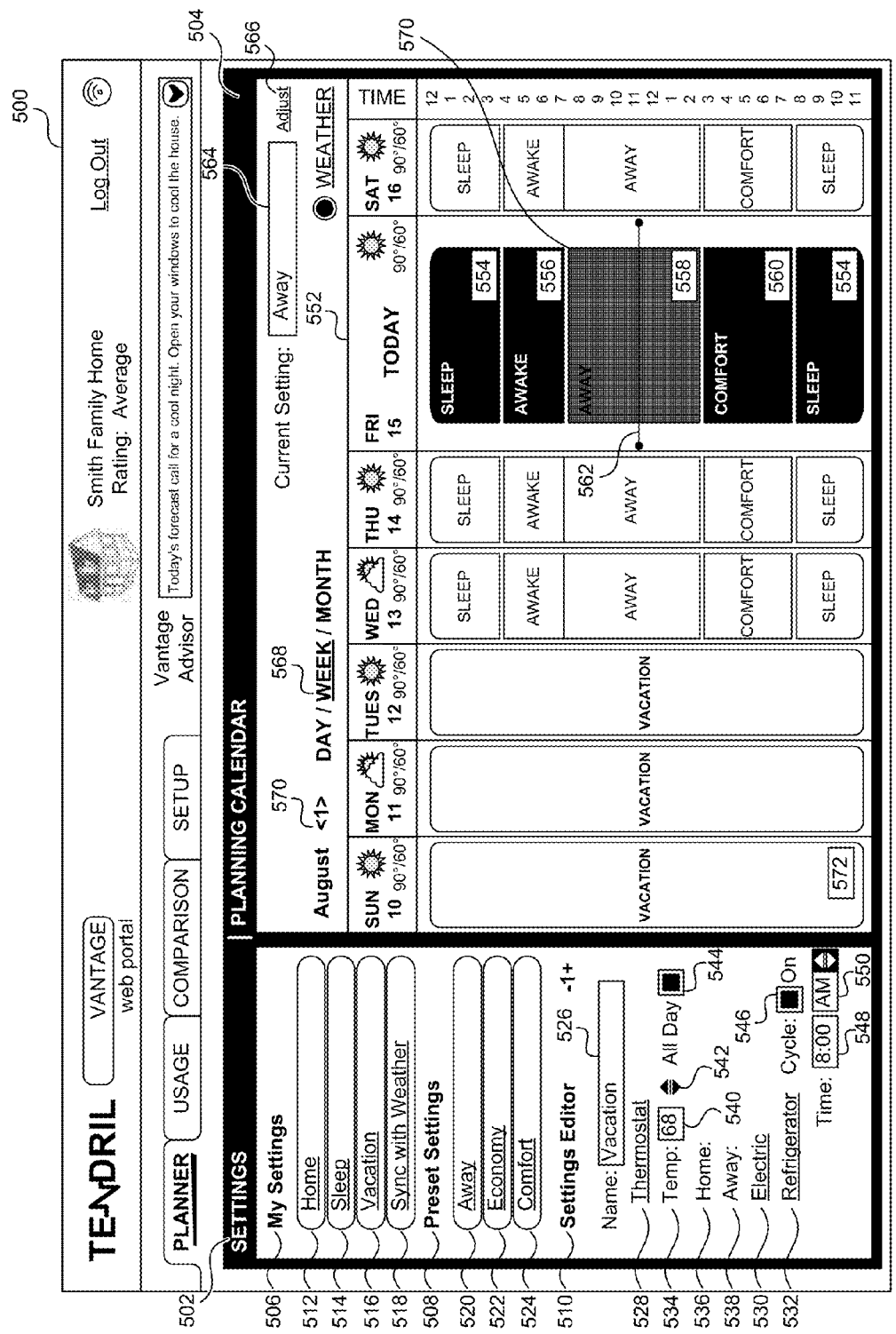
FIG. 5 is a screenshot of a web based user interface for setting consumer schedules and preferences.

FIG. 5 is a screenshot of a web based user interface 500 for setting consumer schedules and preferences in accordance with embodiments of the disclosure. The web based interface 500 corresponds to the web based interface 322 of FIG. 3, and includes Settings 502 and a Planning Calendar 504. Settings 502 include My Settings 506, which are defined by the consumer, Preset Settings 508, which are predefined by the system and/or utility, and a Settings Editor 510. In the example depicted in FIG. 5, the consumer has defined settings including Home 512, Sleep 514, Vacation 516, and Sync with Weather 518. Preset Settings 508 include Away 520, Economy 522, and Comfort 524.

Using the Settings Editor 510, the consumer defines one or more actions that are to be taken by the utility with regard to load control elements in the consumer's residential network, in accordance with an associated setting. To edit a setting in the Settings Editor 510, the consumer selects a setting from My Settings 506 or Preset Settings 508, such as by selecting a button or link associated with the setting text (e.g., by clicking on "Vacation" in My Settings 506), by typing in a setting in Name box 526, by selecting a setting from a drop down or other menu associated with the Name box 526, or in another manner. In the example depicted in FIG. 5, the user has selected the "Vacation" setting for editing.

Once a setting has been selected for editing, the consumer uses the Settings Editor 510 to define one or more actions with regard to load control elements that are to be associated with the selected setting. In the example depicted in FIG. 5, the consumer may define actions to be taken with regard to a Thermostat 528, Electricity 530, and a Refrigerator 532. For example, the consumer has selected a temperature 534 at which the Thermostat 528 is to be set. The consumer may select a temperature by typing a temperature in a box 540, selecting a temperature from a drop down or other menu associated with the box 540, using arrows 542 until a desired temperature is reached, or in another manner. If the consumer desires the selected temperature 534 to be maintained all day, the consumer may select the associated radio button 544. Otherwise, the consumer may set times 536 and 538 at which the consumer expects to be home and away, respectively, so that the thermostat may be adjusted accordingly.

In addition, in the example depicted in FIG. 5, the consumer has defined actions with regard to the Refrigerator 532. The consumer has selected radio button 546 to turn on the refrigerator cycle, and has entered a time using boxes and/or drop-down menus 548 and 550 that the cycle is to commence.

The Planning Calendar 504 of the web based user interface 500 allows the consumer to view and modify settings on a daily, weekly, or monthly basis. In the selected Week view 568, the consumer can view and modify the settings for a selected week. The consumer can change the selected week via the arrows 570, or in another manner. In some embodiments, the Planning Calendar 504 initially highlights the current day 552. The current time for the current day 552 is indicated by a timeline 562. In the example depicted in FIG. 5, the current day 522 includes two sleep setting blocks 554, an awake setting block 556, an away setting block 558, and a comfort setting block 560. In some embodiments, these blocks are color-coded or otherwise distinguished so that the consumer can easily identify the setting associated with a given block of time.

The consumer can modify the settings for a given day in a variety of ways. For example, the consumer can drag and drop an upper and/or lower boundary of a given block. For instance, if the consumer desires the away setting to begin at 7 a.m. instead of 8 a.m. as currently depicted in FIG. 5, the consumer may drag an upper boundary 570 of the away setting block 558 from 8 a.m. to 7 a.m. The bordering awake setting block 556 will be adjusted accordingly, ending at 7 a.m. instead of 8 a.m.

Alternatively or additionally, the consumer can modify the current setting by typing in a new setting in a Current Setting box 564 or selecting a new setting in a drop down or other menu associated with the Current Setting box 564. The consumer can also modify the current setting by selecting an Adjust link 566. Selection of the Adjust link 566 provides the consumer with a pop up or other menu from which the consumer may select a new setting.

In some embodiments, the consumer can apply a given setting or settings to multiple days, such as each weekday during the week, each weekend day, every Friday, or a sequence of selected days. For example, in the Planning Calendar 504 depicted in FIG. 5, the consumer has applied a Vacation setting 572 to the sequence of days Sunday, Monday, and Tuesday. The consumer may apply settings to multiple days in a variety of ways. For example, the consumer may select on the Planning Calendar 504 the days to which common settings are to be applied, and then select a setting in the Settings area 502. For example, the depicted consumer may have selected Sunday through Tuesday in the Planning Calendar 504 and then selected the Vacation setting 516 from My Settings 506. Alternatively or additionally, the consumer may drag and drop the Vacation setting 516 to the selected series of days, Sunday through Tuesday, or to each of these days individually.

Figure 6:
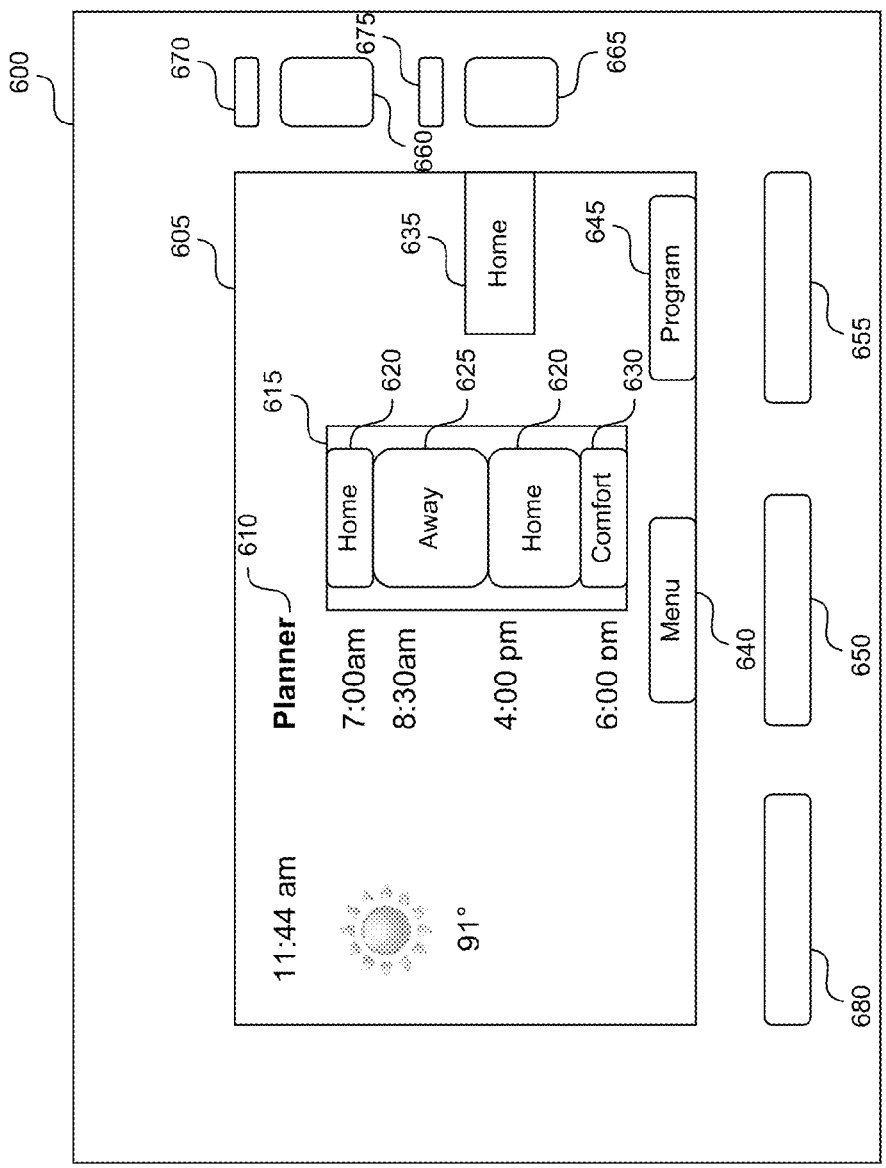
FIG. 6 is a screenshot of a device based user interface for setting consumer schedules and preferences.

Another user interface for setting consumer schedules and preferences is a device based user interface. FIG. 6 is a screenshot of a device 600 including a device based user interface 605 for setting consumer schedules and preferences in accordance with embodiments of the disclosure. The device based user interface 605 corresponds to the device based user interface 320 of FIG. 3, and is a simplified user interface designed to accommodate devices with limited display areas and/or less sophisticated user interfaces. In some embodiments, the device based user interface is operated by associated buttons, including buttons 650, 655, 660, 665, and 680. Alternatively or additionally, the device based user interface may be operated by voice recognition software, a touchscreen display, or a combination of these and other technologies.

The device based user interface 605 includes a Planner 610 that includes a schedule 615 for a selected day. In some embodiments, the Planner 610 displays the current day as the selected day by default. In the example depicted in FIG. 6, the schedule 615 includes two home setting blocks 620, an away setting block 625, and a comfort setting block 630. These settings can be modified by the consumer in a variety of ways. For example, the consumer can modify the Home setting by selecting the button 665 associated with the Home setting. In some embodiments, the consumer presses the button 665 for a short duration to scroll through available settings, and presses the button 665 for a longer duration to select the displayed setting for editing. In addition, the consumer can modify available settings by selecting the Menu 640 via associated button 650 and/or Program via associated button 655.

The device 600 may include a variety of indicators 670 and 675 to communicate information to the user. For example, indicators 670 and 675 may be light emitting diodes (LEDs) that communicate device 600 status information to the user, such as whether the device is on or off, which setting is currently active, and/or a variety of other status information.

Another user interface for setting consumer schedules and preferences is an automatic calendar interface 324. The automatic calendar interface 324 obtains calendar and schedule information automatically from external calendar programs, such as computer, device, and web based calendar applications. The data obtained from these calendar programs is used to determine when a consumer is home or away from home, in addition to other schedule and/or preference information.

Figure 7:
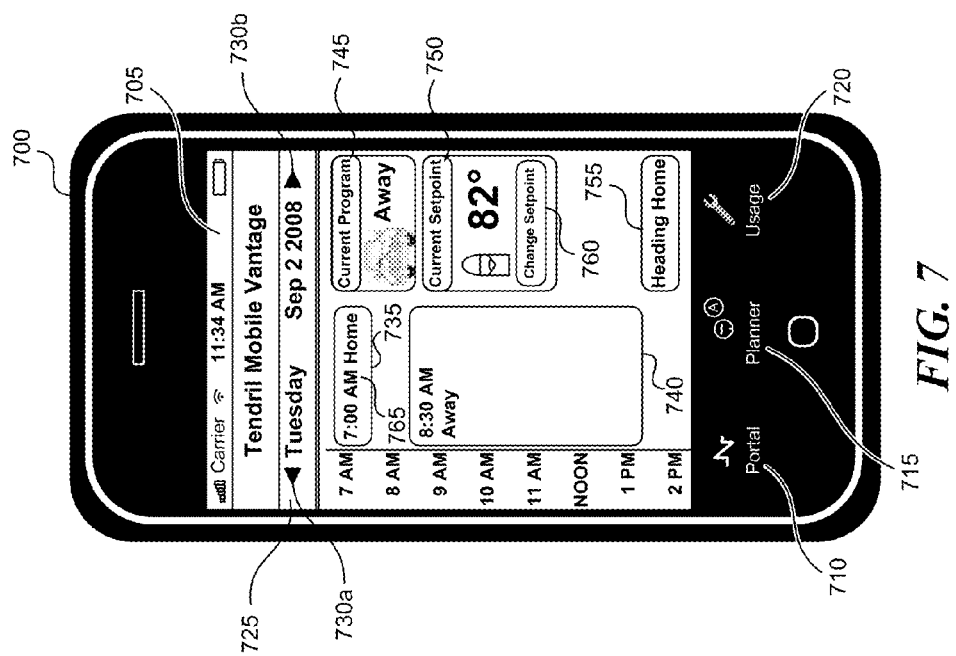
FIG. 7 is a screenshot of a mobile device based user interface for setting consumer schedules and preferences.

In addition, a consumer can set his or her schedule and preferences via a mobile device based user interface. FIG. 7 is a screenshot of a mobile device 700 including a mobile device based user interface 705 for setting consumer schedules and preferences in accordance with embodiments of the disclosure. The mobile device based user interface 705 corresponds to the mobile device based user interface 326 of FIG. 3. The mobile device based user interface 705 allows a consumer to access a mobile energy portal 710, a planning calendar 715, and energy usage data 720. In the example depicted in FIG. 7, the planning calendar 715 is the currently selected program.

In some embodiments, when the consumer selects the planning calendar 715, the mobile device based user interface 705 displays calendar data for the current day 725. The consumer can change the selected day by using the arrows 730a and 730b, by sliding his or her finger across the device 700 screen, or in another manner. In the example depicted in FIG. 7, the calendar data for the current day 725 includes two setting blocks: Home 735 and Away 740. As with the web based planning calendar 504 depicted in FIG. 5, the consumer can modify the settings for a given day in a variety of ways. For example, the consumer can drag and drop, pull, or otherwise adjust an upper and/or lower boundary of a given setting block. For instance, if the consumer desires the home setting to remain in effect until 9:00 AM instead of 8:30 AM as currently depicted in FIG. 7, the consumer may pull a lower boundary 765 of the Home setting block 735 from 8:30 AM to 9:00 AM. The bordering Away block 740 will be adjusted accordingly, beginning at 9:00 AM instead of 8:30 AM.

Alternatively or additionally, the consumer can modify the current setting by selecting the Current Program box 745, selecting one of the setting blocks 735 or 740, or in another manner. Such a selection provides the consumer with a pop up or other menu from which the consumer may select a new setting.

The mobile device based user interface 705 also includes information about actions associated with the current setting, such as the Current Setpoint 750. In the example depicted in FIG. 7, the current setpoint is set to 82°. The consumer can change the current setpoint by selecting the Current Setpoint button 760. Selection of the Current Setpoint button 760 provides the consumer with a pop up or other menu from which the consumer may select a new setpoint.

In some embodiments, the mobile device based user interface 705 provides consumers with additional means to control their schedules and/or preferences. For example, when a consumer is headed home, the consumer may select the Heading Home button 755. In some embodiments, selection of this button 755 signals the home network that it should begin transitioning to an at-home setting, such as Home or Comfort. For example, in some embodiments, the home network transitions to the next at-home setting on the user's schedule. For instance, the consumer's schedule may indicate that he is Away until 2:00 PM and that the Comfort setting should begin at 2:00 PM. If the consumer selects the Heading Home button 755 at noon, the home network will begin transitioning from the Away setting to the Comfort setting at this time, rather than waiting until 2:00 PM.

In some embodiments, the mobile device user interface 705 utilizes data available from one or more mobile phone networks, such as mobile phone network 328 depicted in FIG. 3. Such data indicates the consumer's geographic location and/or other data. In such embodiments, the techniques described herein utilize the available geographic location data to automatically determine if the consumer is home or away from home, without requiring any interaction from the consumer. Such data triggers preferences associated with the consumer's schedule, such as those that differ whether the consumer is home or away from home. In this and other ways, the mobile device user interface 705 simplifies the operation of the techniques described herein, by obtaining schedule and preference information without requiring manual entry of such information by a consumer.

Returning to FIG. 3, an energy management processor 304 obtains user preferences and other information from the user energy preferences database 302. In addition, the energy management processor 304 obtains trigger data from a variety of sources, such as a utility demand response program 330, weather 332, energy prices 334, energy source information 336 (e.g., wind, solar, or coal), time 338, and/or other trigger data 340. When trigger data changes, the energy management processor 304 examines the preference data in the user energy preferences database 302 in order to determine whether any actions are to be taken in the consumer's home network. For example, if the time advances from 11:59 a.m. to 12:00 p.m., the energy management processor 304 examines the user preferences to determine if any consumers' schedule has a new setting or activity beginning at 12:00 p.m. If such a setting or activity is discovered, and a change to a device is required, the energy management processor 304 communicates the change to the ESP device 310 of the consumer's residential network 308 via the network 306. In turn, the ESP device 310 communicates the updated setting information over the residential network 308 to the device or devices that require the setting update.

In some embodiments, a utility energy reduction processor 342 enables utilities to implement demand response programs in a manner that minimizes the impact on consumers, in addition to achieving other benefits. The utility energy reduction processor 342 enables a utility to search consumer preferences in the user energy preferences database 302. For example, the utility can search for information regarding consumers that are willing to reduce their energy usage under specific scenarios. As described in additional detail herein, a utility may have predefined one or more criticality levels, such as Critical, High, Medium, and Low. Users can volunteer to reduce their energy consumption in association with one or more of these levels, such as by defining one or more actions that are to be taken in association with a criticality level.

The utility energy reduction processor 342 provides the utility with information about the amount and type of energy reduction available to the utility under each criticality level. For example, the utility energy reduction processor 342 may indicate that at a Medium criticality level, the utility achieves a 10% reduction in energy usage, and that 82% of that reduction is in traditional power sources, 10% of that reduction is in wind power sources, and 8% is in other power sources. In addition, the utility energy reduction processor 342 is capable of providing more detailed information, such as providing information about only those consumers who are currently away from home. Utilizing the information provided by the utility energy reduction processor 342, the utility can make decisions about which criticality level should be set to achieve the desired energy reduction. Moreover, the utility energy reduction processor 342 enables the utility to create a demand response program that minimizes the impact on consumers, such as by changing settings only among consumers whose preferences and/or schedules indicate that they are away from home.

The utility provides information obtained from the utility energy reduction processor 342 to the energy management processor 304 via the utility demand response program 330 trigger. The energy management processor 304 sends the appropriate control signals to the ESP device 310 of the consumer's residential network 308 to implement any associated energy reduction.

3. Conclusion

Various embodiments of the disclosure are described herein. It will be appreciated that details set forth herein are provided to describe the embodiments in a manner sufficient to enable a person skilled in the relevant art to make and use the disclosed embodiments. Several of the details and advantages, however, may not be necessary to practice some embodiments. Additionally, some well-known structures or functions may not be shown or described in detail, so as to avoid unnecessarily obscuring the relevant description of the various embodiments. Furthermore, features, structures, or characteristics of various embodiments may be combined in any suitable manner.

Moreover, one skilled in the art will recognize that there are a number of other technologies that could be used to perform functions similar to those described herein. While processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The terminology used in the description is intended to be interpreted in its broadest reasonable manner, even though it is being used in conjunction with a detailed description of identified embodiments. Moreover, the headings provided herein are for convenience only.

Unless the context clearly requires otherwise, throughout the disclosure, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

Any patents, applications and other references, including any that may be listed in accompanying filing papers, are incorporated herein by reference. Aspects of the disclosure can be modified, if necessary, to employ the systems, functions, and concepts of the various references described above to provide yet further embodiments.

These and other changes can be made in light of the above Detailed Description. While the disclosure details certain embodiments and describes the best mode contemplated, no matter how detailed, various changes can be made. Implementation details may vary considerably, while still being encompassed by the disclosure.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system for providing consumer directed energy management, wherein the system comprises:
   a consumer preferences database configured to:
      for each consumer of a plurality of consumers having a residential energy network, receive, from the consumer,
         information associated with the consumer's preferences regarding one or more energy consuming devices in the consumer's residential energy network,
            wherein the consumer preferences database is connected to the consumer residential energy networks via at least one network connection, such that a plurality of preferences of consumers are stored remote from the residential energy networks; and
   an energy management processor configured to:
      receive the stored information from the consumer preferences database,
      receive trigger data from a plurality of trigger data sources, and
      in response to receiving the trigger data from the plurality of trigger data sources, for each of the plurality of consumers,
         examine the received information to determine whether any actions are to be taken in the consumer's residential energy network, and
         in response to determining that at least one action is to be taken in the consumer's residential energy network, transmit, to the consumer's residential energy network, control instructions for taking the at least one action in the consumer's residential energy network,
   wherein a first consumer's preferences comprise:
      a first trigger,
      a first trigger level, and
      a first action,
   wherein the first action is taken in response to the first trigger level being reached,
   wherein the first trigger specifies a first type of energy source,
   wherein the first trigger level is a first percentage of energy provided by the first type of energy source exceeding a preset limit,
   wherein the first action is to send one or more control instructions to at least one of the energy consuming devices in the first consumer's residential energy network to limit demand on the first type of energy source so that the system is configured to limit demand on the first type of energy source in response to determining that the first percentage of energy provided by the first type of energy source exceeds the preset limit, and
   wherein the first consumer's residential energy network receives energy from multiple types of energy sources.

2. The system of claim 1 further comprising:
   a user interface by which the plurality of consumers can define the consumer preferences.

3. The system of claim 2 wherein the user interface is a web based user interface.

4. The system of claim 2 wherein the user interface is a device based user interface.

5. The system of claim 2 wherein the user interface is a mobile device based user interface.

6. The system of claim 1 wherein the first trigger further comprises the first consumer's schedule or a criticality event defined by a utility.

7. The system of claim 1 wherein the energy management processor further receives trigger data from one or more data sources, and wherein the first action is determined based on the received information associated with the first consumer's preferences and the received trigger data.

8. The system of claim 1 further comprising:
a utility energy reduction processor that:
obtains the first consumer's preferences from the consumer preferences database, and
provides energy reduction data to the energy management processor, wherein the energy reduction data indicates a reduction in energy associated with a criticality event, and wherein the energy reduction data is determined based on the first consumer's preferences.

9. The system of claim 1 wherein the at least one consumer's residential energy network is configured according to a ZigBee Smart Energy protocol.

10. The system of claim 1 wherein a second trigger is a criticality event defined by a utility.

11. The system of claim 1 wherein the first type of energy source is wind so that the first action is taken in response to determining that a percentage of energy provided by wind energy sources exceeds the preset limit.

12. A computer-readable medium, that is not a propagating signal, storing instructions that, if executed by an energy management processor, cause the energy management processor to perform operations comprising:
receiving, from a consumer preferences database, consumer preference information for each of a plurality of consumers;
receiving trigger data from a plurality of trigger data sources; and
in response to receiving the trigger data from the plurality of trigger data sources,
for each of the plurality of consumers,
examining the received consumer preference information to determine whether any actions are to be taken in the consumer's residential energy network based on at least one change in the trigger data, and
in response to determining that at least one action is to be taken in the consumer's residential energy network based on the at least one change in the trigger data,
communicating, to the consumer's residential energy network via a network connection, the at least one change in the trigger data, and
communicating, to the consumer's residential energy network via the network connection, control instructions for taking the at least one action,
wherein a first consumer's preferences include a first trigger, a first trigger level, and a first action,
wherein the first action is taken in response to the first trigger level being reached, and
wherein the at least one change in the trigger data comprise at least one of:
a change in a first percentage of energy provided by a first type of energy source that exceeds a preset limit, or
a change in a second percentage of energy provided by a second type of energy source,
wherein the first action is to send one or more control instructions to at least one energy consuming device in the first consumer's residential energy network to limit demand on the first or second type of energy source so that the system is configured to limit demand on the first or second type of energy source in response to determining that the first or second percentage of energy provided by the first or second type of energy source exceeds at least one preset limit, and
wherein the residential energy network of the first consumer receives energy from multiple types of energy sources.

13. The computer-readable medium, that is not a propagating signal, of claim 12 wherein the first trigger further comprise a designated criticality event defined by a utility.

14. A method, performed by a computing system having a memory and a processor, the method comprising:
receiving consumer preference information for each of a plurality of consumers, wherein the consumer preference information comprises a first trigger, a first trigger level, and a first action, wherein the first trigger specifies at least a first energy source and wherein the first trigger level is a first percentage of energy provided by a first type of energy source exceeding a first preset limit;
receiving trigger data from a plurality of trigger data sources;
for each of the plurality of consumers,
examining the received consumer preference information to determine whether any actions are to be taken in the consumer's residential energy network based on at least one change in the trigger data,
wherein the at least one change in the trigger data for a first consumer comprise at least one of:
a change in a first percentage of energy provided to the residential energy network of the first consumer by the first type of energy source, or
a change in a second percentage of energy provided to the residential energy network of the first consumer by a second type of energy source, and
wherein the examining comprises:
determining whether a change in the first percentage of energy provided to the residential energy network of the first consumer by the first type of energy source causes the first percentage of energy provided to the residential energy network of the first consumer by the first type of energy source to exceed the first preset limit,
wherein the first percentage of energy provided to the residential energy network of the first consumer by the first type of energy source is greater than zero, and
determining whether a change in the second percentage of energy provided to the residential energy network of the first consumer by the second type of energy source causes the second percentage of energy provided to the residential energy network of the first consumer by the second type of energy source to exceeds a second preset limit, wherein the second percentage of energy provided to the residential energy network of the first consumer by the second type of energy source is greater than zero;

in response to determining that at least one first action is to be taken in the first consumer's residential energy network based on the change in the first percentage of energy provided to the residential energy network of the first consumer by the first type of energy source indicating that the first percentage of energy provided to the residential energy network of the first consumer by the first type of energy source exceeds the first preset limit, communicating, to the first consumer's residential energy network via a network connection, the change in the first percentage of energy provided to the residential energy network of the first consumer by the first type of energy source, and communicating to at least one energy consuming device in the first consumer's residential energy network via a network connection, control instructions for taking the at least one first action, wherein the at least one first action comprises limiting demand on the first type of energy source;

in response to determining that at least one second action is to be taken in the first consumer's residential energy network based on the change in the second percentage of energy provided to the residential energy network of the first consumer by the second type of energy source indicating that the second percentage of energy provided to the residential energy network of the first consumer by the second type of energy source exceeds a second preset limit, communicating, to the first consumer's residential energy network via a network connection, the change in the second percentage of energy provided to the residential energy network of the first consumer by the second type of energy source, and communicating, to the first consumer's residential energy network via a network connection, control instructions for taking the at least one second action wherein the at least one second action comprise limiting demand on the second type of energy source so that the system is configured to limit demand on the first or second type of energy source in response to determining that the first or second percentage of energy provided by the first or second type of energy source exceeds the first or second preset limit.

15. The method of claim 14 wherein the trigger data comprises weather data, energy prices, and energy source information.

16. The method of claim 14, further comprising:
determining a first percentage of energy provided by wind energy sources;
determining whether the first percentage of energy provided by wind energy sources exceeds a preset limit; and
in response to determining that the first percentage of energy provided by wind energy sources exceeds the preset limit, limiting demand on energy from wind energy sources.

17. The method of claim 14, further comprising:
determining a first percentage of energy provided by solar energy sources;
determining whether the first percentage of energy provided by solar energy sources exceeds a preset limit; and
in response to determining that the first percentage of energy provided by solar energy sources exceeds the preset limit, limiting demand on energy from solar energy sources.

18. The method of claim 14, further comprising:
determining a first percentage of energy provided by coal energy sources;
determining whether the first percentage of energy provided by coal energy sources exceeds a preset limit; and
in response to determining that the first percentage of energy provided by coal energy sources exceeds the preset limit, limiting demand on energy from coal energy sources.

19. The method of claim 14, further comprising:
automatically determining whether the first consumer is home or away from home, without requiring any interaction from the first consumer based at least in part on available geographic location data.

20. The method of claim 14 wherein the first type of energy source is wind and wherein the second type of energy source is not wind.

21. The method of claim 14 wherein the first type of energy source is coal and wherein the second type of energy source is not coal.

22. A method, performed by a computing system having a memory and a processor, the method comprising:
receiving, from a consumer preferences database, consumer preference information for each of a plurality of consumers, wherein the consumer preference information for each of the plurality of consumers comprises:
a trigger that specifies at least one energy source type,
a trigger level, and
a first action associated with at least one or more energy consuming devices in the consumer's residential energy network,
wherein the first action is taken in response to the trigger level being reached,
wherein the trigger level is a first percentage of energy provided by the at least one energy source type relative to a preset level so that the first action is taken in response to determining that the first percentage of energy provided by the at least one energy source type to the at least one or more energy consuming devices in the consumer's residential energy network has reached the trigger level;
receiving trigger data from a plurality of trigger data sources; and
in response to receiving the trigger data from the plurality of trigger data sources,
for each of the plurality of consumers,
examining, by the computing system, the received consumer preference information to determine whether any actions are to be taken in the consumer's residential energy network, and
in response to determining that at least one action is to be taken in the consumer's residential energy network, communicating, to at least one energy consuming device in the consumer's residential energy network via a network connection, control instructions for taking the at least one action to limit demand on the at least one energy source type so that the system is configured to limit demand on the at least one energy source type in response to determining that the first percentage of energy provided by the at least one energy source type exceeds the preset level,
wherein determining that at least one action is to be taken in at least one consumer's residential energy network comprises:
  determining that there has been a change in a first percentage of energy provided to the at least one consumer's residential energy network by a first type of energy source, and
  determining that there has been a change in a second percentage of energy provided to the least one consumer's residential energy network by a second type of energy source.

23. The method of claim 22, wherein the energy source type is wind so that the first action is taken in response to determining that the percentage of energy provided by wind energy sources to the at least one or more energy consuming devices in the consumer's residential energy network has reached the trigger level.

24. The method of claim 22, wherein the energy source type is solar so that the first action is taken in response to determining that the percentage of energy provided by solar energy sources to the at least one or more energy consuming devices in the consumer's residential energy network has reached the trigger level.

25. The method of claim 22, wherein the energy source type is coal so that the first action is taken in response to determining that the percentage of energy provided by coal energy sources to the at least one or more energy consuming devices in the consumer's residential energy network has reached the trigger level.

26. A method, performed by a computing system having a memory and a processor, the method comprising:
  storing, for a consumer having a plurality of controllable devices, a set of preferences, wherein at least one preference of the set of preferences comprises:
    a trigger,
    a level or levels of the trigger,
      wherein at least one of the levels comprises a first threshold percentage of energy provided to the consumer by a first type of energy source, wherein the consumer receives energy from multiple types of energy sources, and
    a set of actions related to at least one controllable device from among the plurality of controllable devices,
      wherein at least one action of the set of actions is to adjust a setpoint of the at least one controllable device in response to determining that a percentage of energy provided to the consumer by the first type of energy source exceeds the first threshold percentage; and
  in response to determining that at least one action is to be taken based on a change in the percentage of energy provided to the consumer by the first type of energy source, the change indicating that the percentage of energy provided to the consumer by the first type of energy source exceeds the first threshold percentage,
    communicating, to the at least one controllable device, control instructions for taking the at least one action.

\* \* \* \* \*